United States Patent [19]
Choi

[11] Patent Number: 5,675,394
[45] Date of Patent: Oct. 7, 1997

[54] EQUALIZATION APPARATUS WITH EFFECTIVE COEFFICIENT UPDATING OPERATION

[75] Inventor: Young-Bae Choi, Seoul, Rep. of Korea

[73] Assignee: Daewoo Electronics Co., Ltd., Seoul, Rep. of Korea

[21] Appl. No.: 572,401

[22] Filed: Dec. 14, 1995

[30] Foreign Application Priority Data

Dec. 14, 1994 [KR] Rep. of Korea ............. 94-34098

[51] Int. Cl.$^6$ ............... H04N 5/21; H04N 5/44
[52] U.S. Cl. ............................ 348/614; 348/775
[58] Field of Search ................. 348/725, 607, 348/611, 614; 375/230, 232, 236; 364/724.16, 724.2; H04N 5/21, 5/44

[56] References Cited

U.S. PATENT DOCUMENTS

| | | | |
|---|---|---|---|
| 4,791,390 | 12/1988 | Harris et al. | 375/236 |
| 5,293,234 | 3/1994 | Ko | 348/614 |
| 5,311,312 | 5/1994 | Oh | 348/614 |
| 5,341,177 | 8/1994 | Roy et al. | 348/614 |
| 5,479,449 | 12/1995 | Patel et al. | 375/316 |
| 5,502,506 | 3/1996 | Choi | 348/607 |
| 5,502,507 | 3/1996 | Kim | 348/607 |

OTHER PUBLICATIONS

Y. S. Choi et al., "Adaptive Blind Equalization Coupled with Carrier Recovery for HDTV Modem", IEEE Transactions On Consumer Electronics, vol. 39, No. 3, Aug. 1993, pp. 386–391.

Hulyalkar et al., "Advanced Digital HDTV Transmission System for Terrestrial Video Simulcasting", IEEE Journal On Selected Area in Communications, vol. 11, No. 1, Jan. 1993, pp. 119–125.

Helyalkar et al, "Advanced Digital HDTV Transmission System For Terrestrial Video Simulcasting", Jul. 1993, vol., No. 1, pp. 119–126.

*Primary Examiner*—John K. Peng
*Assistant Examiner*—Jeffrey S. Murrell
*Attorney, Agent, or Firm*—Anderson Kill & Olick P.C.

[57] ABSTRACT

An equalization apparatus for use in a television system includes a equalizer filter having a plurality of equalizer coefficients and an updating circuit. In the updating circuit, the equalizer coefficients are adjusted by using two computational terms: a CMA term; and a Cauchy term in order to effectively make the equalizer to converge to the global minimum of the coarse MSE function all the time. Both terms decrease to zero as the equalizer coefficients approach to a minimum, but in different ways: the first CMA term decreases to zero monotonously; and the value of the second Cauchy term fluctuates up and down, depending on the selected value for the Cauchy distribution function and thus temporary increases, although contained, are allowed during the process. A combination of the two terms with a proper choice for the weight factors prevents the equalizer coefficients from converging to a local minimum of the coarse MSE function and makes them converge to the global minimum thereof all the time.

4 Claims, 2 Drawing Sheets

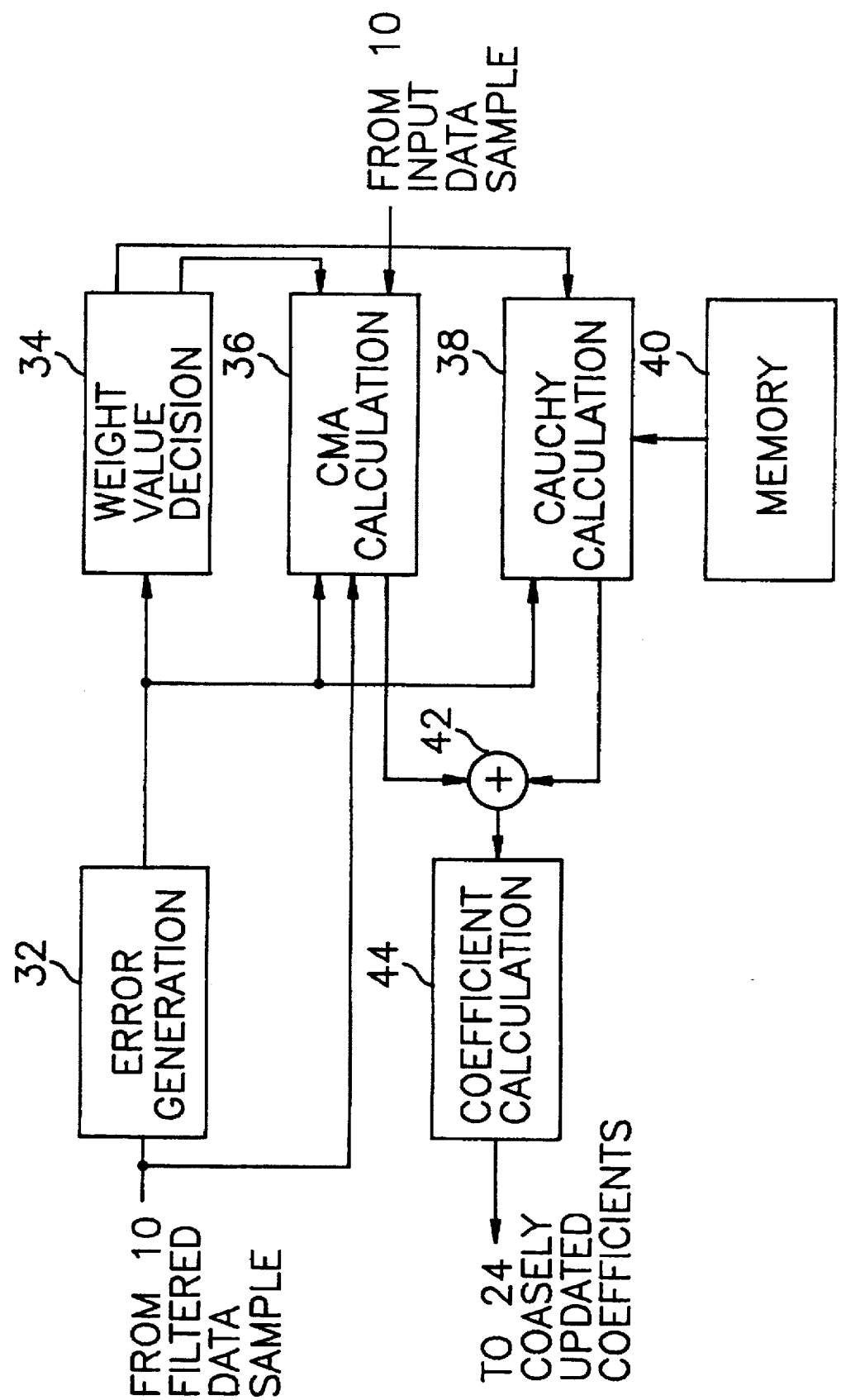

EQUALIZATION APPARATUS WITH EFFECTIVE COEFFICIENT UPDATING OPERATION

FIELD OF THE INVENTION

The invention relates to an equalization apparatus for use in a high definition television (HDTV) signal receiving system; and, more particularly, to an improved equalization apparatus which is capable of providing an effective coefficient updating operation.

DESCRIPTION OF THE PRIOR ART

In a HDTV system, television signals from a television signal transmission source are transmitted over a transmission channel to a HDTV signal receiving system. One inherent problem associated with the transmission of television signals over the transmission channel is that channel distortions and additive noises tend to disrupt, e.g., data symbols contained in the transmitted television signal, thereby adversely affecting the ability of the HDTV signal receiving system to distinguish the received symbol levels. To ameliorate this problem, a typical HDTV signal receiving system includes a channel adaptive equalizer.

Such a prior art channel adaptive equalizer employs a filtering device that removes from a received signal amplitude and phase distortions resulting from, e.g., a frequency dependent time-variant response of the transmission channel, to thereby provide an improved symbol decision capability.

One of such equalization apparatus for use in a HDTV signal receiving system is disclosed in an article by Samir N. Hulyalkar et al., "Advanced Digital HDTV Transmission System for Terrestrial Video Simulcasting", *IEEE Journal on Selected Areas in Communications*, 11, No. 1, pp 119–125 (January, 1993), which includes a finite impulse response (FIR) filter employing a plurality of equalizer coefficients called tap coefficients and a coefficient updating module to provide a self-adjustment without using a training sequence. The coefficient updating module is operated in two modes: a blind mode and a decision directed mode. In the blind mode, the equalizer coefficients are coarsely adjusted to their coarse initial values, corresponding to a coarse error function wherein the coarse error function is calculated by employing a known nonlinear function, i.e., the so-called cost function represented by a higher order equation. In the decision directed mode, the equalizer coefficients are finely updated to their optimum values by using a decision error function wherein the decision error function is calculated by using a known decision function. The initial values for the equalizer coefficients mentioned above are obtained in an iterative process by requiring that the differentiation of the cost function is reduced to zero, thereby allowing the cost function to converge to a minimum value. In this case, however, the cost function sometimes converges to a local minimum value instead of a global minimum. As a result, it is difficult to correctly adjust the equalizer coefficients to initial optimum values corresponding to the global minimum value of the error function.

SUMMARY OF THE INVENTION

It is, therefore, a primary object of this invention to provide an improved television signal equalization apparatus which is capable of converging equalizer coefficients to their optimum values.

In accordance with the invention, there is provided an equalization apparatus for use in a television signal receiving system, which includes an equalizing filter having a set of equalizer coefficients for equalizing an input television signal distorted from an original signal in a transmission channel to produce a filtered output signal, wherein the input television signal includes a plurality of data samples and the filtered output signal has a corresponding plurality of filtered output data samples; and an updating circuit for generating, in response to a data sample and a filtered output data sample corresponding thereto, a set of updated equalizer coefficients as the set of equalizer coefficients for the equalizer filter, characterized in that said updating circuit comprises:

error generating means, in response to the filtered output data sample, for generating an error value denoting the difference between the filtered output data sample and a predetermined expected value and for generating a means square error value of the error value;

memory means for storing the set of updated equalizer coefficients as a set of previous equalizer coefficients and for storing a predetermined step size;

first calculation means for multiplying the data sample, the filtered output data sample, the predetermined step size and the error value to generate a first calculation value;

second calculation means for multiplying the error value with a random value arbitrarily selected from a known Cauchy distribution function to provide a second calculation value;

weighting means, based on the means square error value, for multiplying the first calculation value with a first weight factor and the second calculation value with a second weight factor to thereby generate a first and a second weighted calculation values; and means for adding the first and the second weighted calculation values to the set of previous equalizer coefficients to produce a set of updated equalizer coefficients as an output of the updating circuit.

BRIEF DESCRIPTION OF THE DRAWINGS

The above and other objects and features of the present invention will become apparent from the following description of preferred embodiments given in conjunction with the accompanying drawings, in which:

FIG. 2 depicts a detailed block diagram of the blind equalization block shown in FIG. 1.

DETAILED DESCRIPTION OF THE PREFERRED EMBODIMENTS

Figure 1:
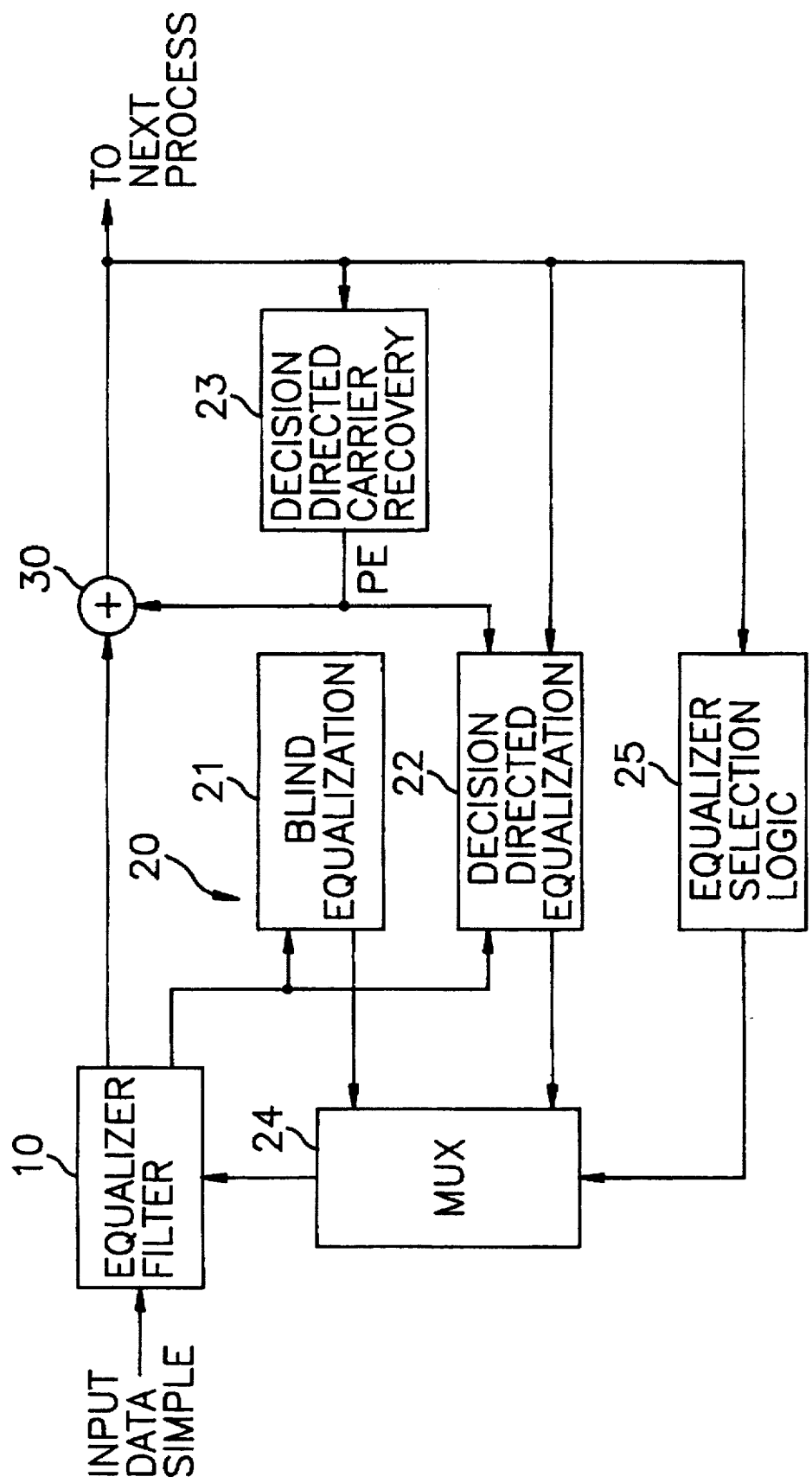
FIG. 1 shows a schematic block diagram of a television signal equalization apparatus employing a blind equalization block in accordance with the present invention.

Referring to FIG. 1, there is shown a television signal equalization apparatus employing a blind equalization block in accordance with the present invention. The television signal equalization apparatus includes an equalizer filter 10 having a multiplicity of equalizer coefficients, and a coefficient update module 20 for generating updated coefficients.

A television signal received from a transmission channel (not shown) is sampled at a known sampling circuit (not shown) into a plurality of input data samples which are sequentially coupled to the equalizer filter 10. The first equalizer filter 10 includes a finite impulse response(FIR) filter, wherein the input data samples are sequentially filtered and equalized by the multiplicity of equalizer coefficients contained therein in order to produce filtered data samples. The filtered data samples are then sequentially coupled to the coefficient update module 20 and via a derotator 30 to a next processor, e.g., a source decoder(not shown).

That is, input data samples y(n)'s are sequentially and iteratively filtered by the equalizer filter 10 to correct the input data samples y(n)'s distorted in the transmission channel by using the equalizer coefficients and to produce filtered data samples as equalized data samples that approximate the original non-distorted data samples prior to their transmission.

As is known, the filtered data sample z(n) from the equalizer filter 10 may be represented as follows:

$$z(n) = \sum_{i=0}^{M_n-1} w_i(n) y\left(n - \frac{M_n}{2} + i\right) \quad (1)$$

wherein $w_i(n)$ is a set of equalizer coefficients corresponding to $M_n$ data samples adjacent to a target input data sample y(n) contained the equalizer filter where $M_n$ is a positive integer representing the number of filter cells.

The equalizer coefficients w(n)'s are iteratively updated by the coefficient updating module 20 until satisfactory equalized samples are obtained. These coefficients and may be represented as follows:

$$w(n+1) = w(n) + \Delta y(n)e(n) \quad (2)$$

wherein $\Delta$ is a small number, e.g., $2^{-10}$ or $^{-12}$ representing a scale factor and e(n) is an error function denoting a difference between the filtered data sample and a non-distorted data sample.

The iteration for updating the filter coefficients w(n)'s in the coefficient update module 20 continues until an optimum set of equalizer coefficients w(n)'s is reached and the filtered data samples z(n)'s, as the equalized data samples which approximate the original data samples, are obtained by the equalizer filter 10 using the optimum set of equalizer coefficients.

The coefficient update module 20, as described in the article by Samir N. Hulyalkar et al., is operated in two mode, i.e., a blind mode and a decision directed mode; and includes a blind equalization block 21, a decision directed equalization block 22 and a decision directed carrier recovery block 23. In the blind mode, the blind equalization block 21 receives the filtered data samples from the equalizer filter 10 and generates coarsely updated equalizer coefficients providing a coarse initial convergence which are coupled via a multiplexer 24 to the equalizer filter 10. In the equalizer filter 10, the coarsely updated equalizer coefficients supersede the previous equalizer coefficients contained therein. This process is repeated until a satisfactory initial convergence is achieved.

On the other hand, in the decision directed mode, the decision directed equalization block 22 receives the filtered data samples from the equalization filter 10 and a phase error PE from the decision-directed carrier recovery block 23; and generates finely updated coefficients by employing a least mean square(LMS) algorithm to achieve an optimum convergence of the equalizer coefficients. The decision-directed carrier recovery block 23 is also operated in the decision directed mode and generates the phase error PE which is coupled to the decision directed equalization block 22 and the derotator 30 in order to minimize the phase offset between the original data samples prior to transmission and the corresponding input data samples. The finely updated coefficients providing the optimum convergence are coupled via the multiplexer 24 to the equalizer filter 10 and supersede previous equalizer coefficients kept therein. This process is repeated until satisfactory equalized data samples are obtained.

The mode change operation is controlled by an equalizer selection logic circuit 25 that generates two mode selection signals: a blind mode selection signal and a decision directed mode selection signal. The equalizer selection logic circuit 25 receives the equalized data samples via the derotator 30 and calculates a mean square error(MSE) value thereof. The MSE value is compared with a first predetermined error value which can be experimentally determined on a basis of so-termed eye pattern which represents the amount of intersymbol interference and noise in a digital communication system and is measured by using a conventional oscilloscope. When the MSE value is greater than the first predetermined error value, the equalizer selection logic circuit 25 generates a blind mode selection signal that actuates the multiplexer 24 in order to couple the coarsely updated equalizer coefficients outputted from the blind equalization block 21 as the updated equalizer coefficients to the equalizer filter 10.

On the other hand, when the MSE value is identical to or smaller than the first predetermined error value, the equalizer selection logic circuit 25 produces a decision directed mode selection signal that couples the finely updated equalizer coefficients outputted from the decision directed equalization block 22 via the multiplexer 24 to the equalizer filter 10 as the updated equalizer coefficients.

The coarsely updated equalizer coefficients described above may be iteratively adjusted by employing a coarse means square error function instead of error function e(n), wherein the coarse means square error(MSE) function can be represented by a cost function denoting a known nonlinear function with respect to the equalizer coefficients. Specifically, as described in the article by Samir N. Hulyalkar et al., the blind equalization block 21 utilizes a known constant modulus algorithm (CMA) having a cost function represented by a fourth degree equation for the purpose of reducing the hardware complexity. In this case, the cost function $D^{(2)}$ denoting the coarse MSE function is known to be represented as follows:

$$D^{(2)} = E[|z(n)|^2 - R_2]^2 \quad (3)$$

wherein z(n) is the filtered data sample previously defined in Eq. (1); $R_2$ is a positive real constant representing a mean radius of a constellation of original data samples (e.g., $R_2 = 26.186$ for 32-quadrature amplitude modulation (QAM) based television system); and E is an expectation function.

Therefore, minimization of the coarse MSE function can be achieved by minimizing the cost function $D^{(2)}$ which can be expressed in terms of the equalizer coefficients w(n) defined in Eq. (1). Accordingly, minimization of the cost function $D^{(2)}$ with respect to the equalizer coefficients can be performed recursively according to a known steepest decent method. Therefore, a coarsely updated equalizer coefficient w(n) can be expressed in terms of the cost function $D^{(2)}$ as follows:

$$w(n+1) = w(n) - \delta \left[ \frac{dD^{(2)}}{dw(n)} \right] \quad (4)$$

wherein $\delta$ is a step-size parameter.

Following a well known standard step in the art, by differentiating the cost function $D^{(2)}$ in Eq. (4), a coarsely updated equalizer coefficient w(n) can be obtained and represented as follows:

$$w(n+1) = w(n) + \mu y(n)z(n)[|z(n)|^2 - R_2] \quad (5)$$

where $\mu$ is a small number, e.g., $2^{-10}$ or $^{-12}$, representing a step-size parameter.

As may be seen from Eqs. (4) and (5), the error function can be represented by a cost function of a fourth degree equation with respect to the equalizer coefficients, wherein the fourth degree equation may have a global minimum and a local minimum. As the differentiation of the cost function is gradually reduced to zero by using the steepest decent method, the equalizer coefficients converge to a minimum of the coarse MSE function. In this case, however, the equalizer coefficients sometimes converge to a local minimum of the coarse MSE function instead of its global minimum.

Therefore, in accordance with the present invention, in order to make the equalizer coefficients to converge to the global minimum of the coarse MSE function all the time, Eq. (5) is modified as follows:

$$w(n+1)=w(n)+\eta[\mu y(n)z(n)(|z(n)|^2-R_2)]+(1-\eta)[(|z(n)|^2-R_2)C(k)] \quad (6)$$

where $\eta$ is a positive real constant denoting a weight factor and $C(k)$ is a Cauchy distribution function well known in the art.

As may be seen from Eq. (6), in the blind equalization block 21 in accordance with the present invention, the equalizer coefficients $w(n)$'s are adjusted by using two computational terms: a CMA term of $\mu y(n)z(n)(|z(n)|^2-R_2)$; and a Cauchy term of $(|z(n)|^2-R_2)C(k)$, in order to effectively make the equalizer converge to the global minimum of the coarse MSE function all the time. Both terms decrease to zero as the equalizer coefficients approach to a minimum, but in different ways. As is well known, the first CMA term decreases to zero monotonously. On the other hand, the value of the second Cauchy term fluctuates up and down, depending on the selected value for the Cauchy distribution function $C(k)$ and thus temporary increases, albeit contained, are allowed during the process. A combination of the two terms with a proper choice for the weight factor $\eta$ prevents the equalizer coefficients from converging to the local minimum of the coarse MSE function and leads them to converge to the global minimum thereof all the time.

Referring to FIG. 2, there is a detailed diagram of the blind equalization block for implementing Eq (6). The blind equalization block 21 includes an error generation block 32, a weight value decision block 34, a CMA calculation block 36, a Cauchy calculation block 38, a memory 40, an adder 42 and a coefficient calculation block 44.

The filtered data samples are sequentially coupled to the error generation block 32 which generate an coarse error value denoting the difference between a filtered data sample and the mean radius of the constellation, and a coarse MSE value. The coarse error value is relayed to the weight value decision block 34 which compares the coarse MSE value obtained by the coarse error value with a second predetermined error value to generate first and second weight factors, wherein the second weight factor is determined as (1—first weight factor). The second predetermined error value is determined as a value slightly greater than the first predetermined error value. The first weight factor is relayed to the CMA calculation block 36 and the second weight factor is inputted to the CMA calculation block 38. As may be seen from Eq. (6), when the coarse MSE value is greater than the second predetermined error value, the first weight factor is determined as a small number and, therefore, the second weight factor is determined as a number greater than the first weight factor.

The coarse error value is simultaneously inputted to the CMA calculation block 36 and the Cauchy calculation block 38. The CMA calculation block 36 receives the input data sample, the filtered data sample, the coarse error value and the first weight factor to produce a CMA calculation value by multiplying them. The Cauchy calculation block 38 receives the coarse error value, the second weight factor and a random Cauchy value from the memory 40 to generate a Cauchy calculation value, wherein the random Cauchy values are selected from the catchy distribution function and randomly prestored in the memory 40.

The CMA and the catchy calculation values are combined in an adder 42 to produce a combined value. The combined value is then provided to the coefficient calculation block 44 which adds the combined value to the previous equalizer coefficients stored therein to produce the coarsely updated equalizer coefficients wherein the coefficient calculation block 44 includes a memory which has a multiplicity of memory locations storing the coarsely updated equalizer coefficients as the previous equalizer coefficients. The previous equalizer coefficients of the equalizer filter are then updated at the coarsely updated equalizer coefficients in the blind mode.

As described above, the set of equalizer coefficients is iteratively and effectively updated by using the input data samples and the coarse error value until an optimum initial set of equalizer coefficients is obtained.

While the present invention has been described with respect to certain preferred embodiments only, other modifications and variations may be made without departing from the spirit and scope of the present invention as set forth in the following claims.

What is claimed is:

1. An equalization apparatus for use in a television signal receiving system, which includes an equalizing filter having a set of equalizer coefficients for equalizing an input television signal distorted from an original signal to produce a filtered output signal, wherein the input television signal includes a plurality of data samples and the filtered output signal has a corresponding plurality of filtered output data samples; and an updating circuit for generating, in response to a data sample and a filtered output data sample corresponding thereto, a set of updated equalizer coefficients as the set of equalizer coefficients for the equalizer filter, characterized in that said updating circuit comprises:

error generating means, in response to the filtered output data sample, for generating an error value denoting the difference between the filtered output data sample and a predetermined expected value and for generating a mean square error value of the error value;

weight factor generation means for generating a first weight factor and a second weight factor based on the mean square value, wherein the second weight factor is determined as (1–the first weight factor);

memory means for storing the set of updated equalizer coefficients as a set of previous equalizer coefficients;

first calculation means for multiplying the data sample, the filtered output date sample, a predetermined step size, the first weight factor and the error value to generate a first calculation value;

second calculation means for multiplying the second weight factor, the error value and a random value arbitrarily selected from a Cauchy distribution function to provide a second calculation value; and means for adding the first and the second calculation values to the set of previous equalizer coefficients to produce a set of updated equalizer coefficients as the set of equalizer coefficients for the equalizer filter.

2. The equalization apparatus as recited in claim 1, wherein the second calculation mean includes a memory for storing a multiplicity of random values constituting the Cauchy distribution function.

3. The equalization apparatus as recited in claim 2, wherein the error value e(n) is represented as:

$$e(n)=(|z(n)|^2-R_2)$$

wherein z(n) is the filtered output data sample and $R_2$ is a positive real constant representing a mean radius of a constellation of original data samples.

4. The equalization apparatus as recited in claim 3, wherein the updated equalizer coefficient w(n+1) is represented as:

$$w(n+1)=w(n)+\eta[\mu y(n)z(n)(|z(n)|^2-R_2)]+(1-\eta)[(|z(n)|^2-R_2)C(k)]$$

wherein $\eta$ is a positive real constant denoting the first weight factor; $(1-\eta)$ is the second weight factor; $\mu$ is a small number representing the predetermined step size; y(n) is the data sample; w(n) is a previous equalizer coefficient and C(k) is the random value selected from the Cauchy distribution function.

* * * * *